US012290710B2

(12) United States Patent
Watson

(10) Patent No.: US 12,290,710 B2
(45) Date of Patent: May 6, 2025

(54) DRY FIRE PROTECTION SPRINKLER ASSEMBLIES AND SYSTEMS

(71) Applicant: Minimax Viking Patent Management GmbH, Bad Oldesloe (DE)

(72) Inventor: Jason Thomas Watson, Hastings, MI (US)

(73) Assignee: Minimax Viking Patent Management GmbH, Bad Oldesloe (DE)

( * ) Notice: Subject to any disclaimer, the term of this patent is extended or adjusted under 35 U.S.C. 154(b) by 0 days.

(21) Appl. No.: 18/897,974

(22) Filed: Sep. 26, 2024

(65) Prior Publication Data

US 2025/0018237 A1 Jan. 16, 2025

Related U.S. Application Data

(63) Continuation of application No. 18/687,052, filed as application No. PCT/US2023/020131 on Apr. 27, 2023, now Pat. No. 12,128,267.

(Continued)

(51) Int. Cl.

*A62C 35/68* (2006.01)
*A62C 35/62* (2006.01)

(Continued)

(52) U.S. Cl.

CPC .............. *A62C 35/68* (2013.01); *A62C 35/62* (2013.01); *A62C 37/12* (2013.01); *A62C 37/14* (2013.01)

(58) Field of Classification Search

CPC ......... A62C 3/004; A62C 35/62; A62C 35/68; A62C 37/12; A62C 37/14

See application file for complete search history.

(56) References Cited

U.S. PATENT DOCUMENTS 1,903,150 A 3/1933 Tyden
2,155,990 A 4/1939 Hodgman, Jr.

(Continued)

FOREIGN PATENT DOCUMENTS

KR 20120021587 3/2012

OTHER PUBLICATIONS

International Searching Authority, International Search Report and Written Opinion in International Appln. No. PCT/2023/020131, Oct. 31, 2023, 16 pp.

*Primary Examiner* — Darren W Gorman
(74) *Attorney, Agent, or Firm* — Perkins Coie LLP

(57) ABSTRACT

Automatic dry sprinkler assemblies for fire protection systems. Preferred embodiments of the automatic dry sprinkler assemblies include a tubular outer housing having an inlet, an outlet opening, and an internal surface configuration proximate the outlet opening that defines an internal landing surface and a cantilevered centering wall. A fluid deflection member is spaced from the outlet opening along a fluid flow path of the assembly. A fluid control assembly disposed within the outer housing for axial translation from an unactuated state to an actuated state of the sprinkler assembly to control fluid flow from the inlet to the outlet for fluid discharge along the fluid flow path to the deflection member. The internal landing surface and cantilevered centering wall are axially spaced from one another proximate the outlet opening to circumscribe and confront components of the fluid control assembly to facilitate centering and axial translation of the fluid control assembly.

20 Claims, 7 Drawing Sheets

Related U.S. Application Data

(60) Provisional application No. 63/337,130, filed on May 1, 2022.

(51) Int. Cl.
*A62C 37/12* (2006.01)
*A62C 37/14* (2006.01)

(56) References Cited

U.S. PATENT DOCUMENTS

| | | | |
|---|---|---|---|
| 2,180,258 | A | 11/1939 | Rowley |
| 2,211,399 | A | 8/1940 | Winslow |
| 2,291,813 | A | 8/1942 | Knight |
| 2,291,818 | A | 8/1942 | Loepsinger |
| 2,732,018 | A | 1/1956 | Grimes |
| 2,768,696 | A | 10/1956 | Sherburne |
| 2,871,953 | A | 2/1959 | Knight |
| 3,007,528 | A | 11/1961 | Gloeckler |
| 3,080,000 | A | 3/1963 | Gloeckler |
| 3,135,331 | A | 6/1964 | Lee |
| 3,584,689 | A | 6/1971 | Willms |
| 3,924,687 | A | 12/1975 | Groos |
| 4,007,878 | A | 2/1977 | Anderson |
| 4,091,872 | A | 5/1978 | Mountford |
| 4,177,862 | A | 12/1979 | Bray |
| 4,220,208 | A | 9/1980 | Jackson et al. |
| 4,228,858 | A | 10/1980 | Sclafani |
| 4,237,982 | A | 12/1980 | Sclafani |
| 4,417,626 | A | 11/1983 | Hansen |
| 5,188,185 | A | 2/1993 | Mears |
| 5,228,520 | A | 7/1993 | Gottschalk |
| 5,415,239 | A | 5/1995 | Kötter et al. |
| 5,775,431 | A | 7/1998 | Ondracek |
| 5,967,240 | A | 10/1999 | Ondracek |
| 6,554,077 | B2 | 4/2003 | Polan |
| 7,143,834 | B2 | 12/2006 | Dolan |
| 7,213,319 | B2 | 5/2007 | Silva, Jr. et al. |
| 7,516,800 | B1 | 4/2009 | Silva, Jr. et al. |
| 7,766,252 | B2 | 8/2010 | Jackson et al. |
| 7,921,928 | B2 | 4/2011 | Thompson et al. |
| 8,387,711 | B2 | 3/2013 | Cordell et al. |
| 8,636,075 | B2 | 1/2014 | Franson |
| 9,744,390 | B2 | 8/2017 | Silva, Jr. et al. |
| 10,099,080 | B2 | 10/2018 | Miller et al. |
| 10,195,473 | B1 | 2/2019 | Silva, Jr. et al. |
| 10,220,231 | B2 | 3/2019 | Franson et al. |
| 10,953,252 | B2 | 3/2021 | Ringer et al. |
| 11,577,108 | B2 | 2/2023 | Thompson et al. |
| 11,786,770 | B2 | 10/2023 | Flowers |
| 2003/0075343 | A1 | 4/2003 | Ballard |
| 2006/0113093 | A1 | 6/2006 | Silva, Jr. |
| 2009/0294138 | A1 | 12/2009 | Jackson |
| 2012/0132444 | A1 | 5/2012 | Buzdum et al. |
| 2020/0061401 | A1 | 2/2020 | Pechacek |
| 2021/0128959 | A1 | 5/2021 | Polan |
| 2022/0331635 | A1* | 10/2022 | Keeling ................ A62C 35/68 |
| 2023/0142713 | A1 | 5/2023 | Flowers |
| 2023/0149953 | A1 | 5/2023 | Flowers |

* cited by examiner

DRY FIRE PROTECTION SPRINKLER ASSEMBLIES AND SYSTEMS

PRIORITY DATA AND INCORPORATION BY REFERENCE

This application is a continuation of U.S. patent application Ser. No. 18/687,052, filed Feb. 27, 2024, which is a 35 U.S.C. § 371 application of International Application No. PCT/US2023/020131, filed Apr. 27, 2023, which claims the benefit of U.S. Provisional Applications No. 63/337,130, filed May 1, 2022, each of which identified application is incorporated by reference in its entirety.

TECHNICAL FIELD

The present invention relates generally to dry sprinkler assemblies.

BACKGROUND ART

Automatic wet fire protection sprinkler systems can be configured with automatic fire protection sprinklers in which the sprinklers are attached to a piping system filled with a firefighting fluid, such as water, under a sufficient pressure for sprinkler operation. Generally, automatic fire protection sprinklers include a sprinkler frame and/or housing having an inlet, an outlet, and an internal passageway through which firefighting fluid flows and is discharged to impact a fluid deflection member that is coupled to the sprinkler frame and spaced from the outlet. Fluid flow through the sprinkler is controlled by a thermally responsive trigger which supports a sealing assembly in a position that seals the internal passageway of the sprinkler. Upon thermal actuation of the trigger in response to a fire, the trigger fractures or collapses thereby releasing the sealing assembly to allow the flow of fluid through the sprinkler internal passageway.

One type of automatic fire protection sprinkler is the automatic dry sprinkler. Some known dry sprinkler assemblies generally include a tubular sprinkler housing with an inlet end fluid opening and a discharge outlet opening axially spaced from the inlet opening with an internal passageway extending therebetween. An internal seal assembly and tubular discharge orifice are supported within the housing between the inlet and outlet openings by a support component and a thermally responsive trigger to seal the sprinkler at the fluid inlet. When the trigger actuates in response to a fire, the supporting component is ejected from the outlet of the housing allowing the internal seal assembly and tubular discharge orifice to axially translate and come to rest on an internal surface or landing of the housing. Examples of dry sprinklers are shown in U.S. Pat. Nos. 5,967,240; 7,766,252; 8,636,075; 10,099,080; 10,220,231 and 11,577,108. Despite these known dry sprinkler assemblies, it is believed that there remains a need to provide configurations of the dry sprinkler assembly to further facilitate positioning and translation of the internal components in dry sprinkler assemblies while minimizing the surface contact between the internal components and the housing of the dry sprinkler assembly.

DISCLOSURE OF INVENTION

Preferred embodiments of an automatic dry sprinkler assembly, preferably, a pendent automatic dry sprinkler assembly, and, more preferably, an early suppression fast response dry sprinkler assembly and their methods of operation are provided. The preferred embodiments of the dry sprinkler assembly include a tubular outer housing extending along a longitudinal sprinkler axis with a first end portion with an internal surface circumscribed about the longitudinal sprinkler axis to define an inlet opening of the tubular outer housing and an annular sealing surface spaced along the longitudinal sprinkler axis from the inlet opening. A second end portion of the preferred embodiments of the automatic dry sprinkler assembly has an internal surface circumscribed about the longitudinal sprinkler axis to define an outlet opening of the tubular outer housing. An internal landing surface is located along the longitudinal sprinkler axis between the inlet opening and the outlet opening, and a centering wall is formed between the internal surface landing and the outlet opening and centered about the longitudinal sprinkler axis. An internal conduit extends from the first end portion to the second end portion along the longitudinal sprinkler axis to axially space the annular sealing surface from the internal landing surface. A fluid deflection member is coupled to the tubular outer housing to locate the fluid deflection member at a fixed distance from the outlet opening and centered on the longitudinal sprinkler axis. A responsive trigger assembly, and preferably a thermally responsive trigger assembly, is disposed between the fluid deflection member and the outlet opening to define an unactuated state of the sprinkler assembly, while operation of the thermally responsive trigger assembly defines an actuated state of the sprinkler assembly. A fluid control assembly is disposed coaxially within the internal conduit, the fluid control assembly includes a seal subassembly having a first position in fluid tight sealed contact with the annular sealing surface in the unactuated state of the sprinkler assembly and a second position spaced from the annular sealing surface in the actuated state of the sprinkler assembly. A fluid flow tube with a fluid intake end is coupled to the seal subassembly and a discharge orifice end opposite the fluid intake end, the discharge orifice end having a terminal end defining a discharge opening, and more particularly, a discharge orifice. An ejectable support member with a support surface, and, more preferably, a support shelf, and a seat surface. The ejectable support member being disposed in the outlet opening in the unactuated state of the sprinkler assembly with the support shelf abutting the terminal end of the discharge orifice end of the fluid flow tube and the seat surface engaging the thermally responsive trigger assembly so as to locate the seal subassembly in the first position.

In preferred embodiments, in the unactuated state of the dry sprinkler assembly, the ejectable support member is circumscribed by the internal landing surface and the centering wall along the longitudinal sprinkler axis between the terminal end of the discharge orifice end of the fluid flow tube and the outlet opening of the second end portion. Preferably, the centering wall is provided as a cantilevered centering wall which includes an internal centering rim located at an intersection of a first surface segment and a second surface segment. The internal surface of the second end portion is located between the internal landing surface and the first surface segment of the centering wall and extends parallel to the longitudinal axis, while the first surface segment extends perpendicular to the longitudinal sprinkler axis and the second surface segment extends parallel to the longitudinal sprinkler axis from the first surface segment to the outlet opening. More preferably, the internal landing surface defines a first internal diameter of the second end portion of the tubular outer housing and the internal centering rim of the cantilevered centering wall defines a second internal diameter of the second end portion of the tubular outer housing, and the first internal diameter is greater than the second internal diameter.

In the preferred embodiments, in an actuated state of the dry sprinkler assembly, the fluid flow tube axially translates so that the discharge orifice end rests upon the internal landing surface while the internal centering rim of the cantilevered centering wall circumscribed about and confronts an outer surface portion of the discharge orifice end, and the second surface segment of the centering wall and the outer surface portion of the discharge orifice end are non-parallel surfaces. Preferably, the second surface segment extends parallel to the longitudinal sprinkler axis and the outer surface portion of the discharge orifice end is skewed, and more particularly, a tapered surface, with respect to the longitudinal sprinkler axis. In a more preferred embodiment, the outer surface portion of the discharge orifice end is frustoconical surface and the second surface segment of the cantilevered centering wall is a cylindrical surface. In a preferred embodiment, an annular gap is formed between the internal surface of the second end portion of the tubular outer housing and the discharge orifice end and between the second surface segment and the discharge orifice end. Preferably, the annular gap has varying widths between the internal landing surface and the outlet opening.

In preferred embodiments, the discharge orifice end is a tubular component having a first end, a second end including a terminal end defining the discharge opening or orifice, and an outer surface having an external annular shoulder between the first end and the second end for surface contact with the internal landing surface of the second end portion of the tubular outer housing. Preferably, the outer surface is a frustoconical profile extending from the external annular shoulder to the terminal end. In a preferred embodiment, in the unactuated state, the ejectable support member includes a central impact surface disposed inside the discharge orifice end of the fluid flow tube; the central impact surface being skewed with respect to the longitudinal sprinkler axis.

In a preferred embodiment, the housing includes a pair of frame arms extending from the second end portion and converge at a distance from the outlet opening, to provide a frame window with a width and height, wherein the thermally responsive trigger assembly has a loading member, and preferably, a load screw, located along the longitudinal sprinkler axis within the frame window. A width of the frame window proximate the terminal end of the load screw is greater than a maximum diameter of the ejectable support member so that, in the actuated state, the ejectable member contacts the load screw within the frame window prior to contacting the frame window, and, more particularly, the pair of frame arms and the convergence of the frame arms.

In preferred embodiments, the dry sprinkler assemblies can include: (1) a thermally responsive trigger assembly having a strut, a lever, a thermally responsive link coupling the strut and lever, and a load screw as a loading member; (2) a fluid deflection member as a planar member having a plurality of tines defining a plurality of spaced apart slots and a diameter to define a deflector-diameter to discharge-orifice-diameter (Dia4:Dia1) ratio that ranges from 2:1 to 1.75:1; (3) a second end portion of the tubular outer housing as a sprinkler frame having a frame body integrally formed with the pair of frame arms, and the frame body includes a threaded internal surface for threaded engagement with the tubular outer housing to define a frame window; and/or (4) a first end portion that has an enlarged conduit portion between the inlet opening and the internal conduit so that the seal subassembly in the actuated state is located within the enlarged conduit portion of the first end portion and a terminal end of the discharge orifice end is located between the outlet opening and the fluid deflection member.

In preferred embodiments, the ejectable support member can include: (a) a section disposed within the outlet opening and an outer diameter greater than an internal diameter of the discharge opening, and a height between the seat surface and the support shelf so that the ejectable support members locates the terminal end of the discharge orifice end along the longitudinal sprinkler axis between the internal landing surface and the annular sealing surface of the first end portion of the tubular outer housing; (b) a support shelf that is an annular shelf defining a shelf diameter equal to the outer diameter of a section of the ejectable support member disposed within the outlet opening and a central section of the ejectable support between the support shelf and the section of the ejectable support member disposed within the outlet opening that has a diameter that varies along the longitudinal sprinkler axis; and/or (c) a height along the longitudinal sprinkler axis between a support surface and seat surface greater than a length of a tapered surface of the discharge orifice end along the longitudinal sprinkler axis.

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1:
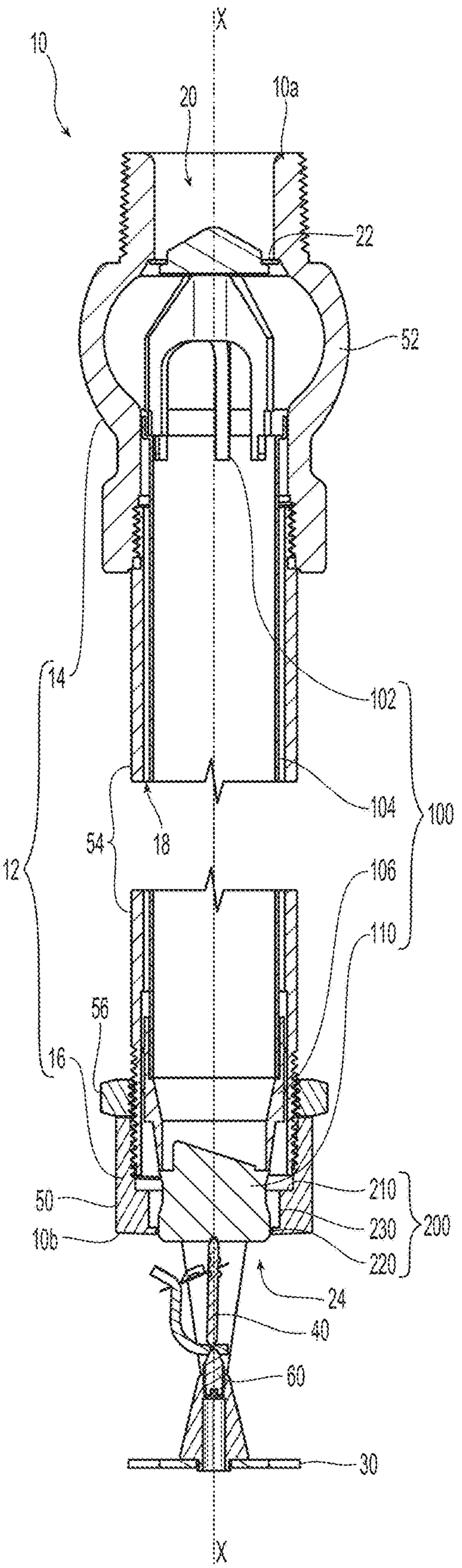
FIG. 1 is a cross-sectional view of a preferred embodiment of a dry sprinkler assembly in an unactuated state.
Figure 2:
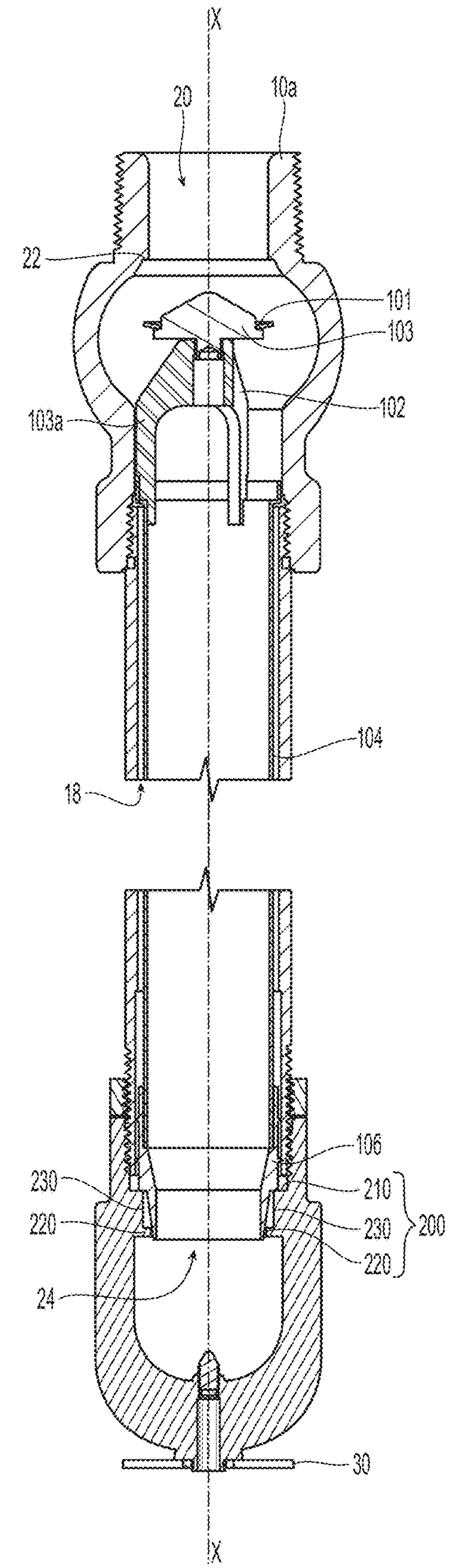
FIG. 2 is a cross-sectional view of the dry sprinkler of FIG. 1 in an actuated state.

Shown in FIGS. 1 and 2 is a preferred embodiment of a dry sprinkler assembly 10 for use in wet fire protection systems. The sprinkler assembly 10 generally includes an elongate tubular outer housing 12 having a first end portion 14 and a second end portion 16 opposite the first end portion 14. Within the tubular housing 12, an internal conduit 18 extends from the first end portion 14 to the second end portion 16 along a longitudinal sprinkler axis X-X. The first end portion 14 of the housing 12 defines a fluid intake end 10*a* of the sprinkler assembly 10 having an inlet opening 20 and an internal sealing surface 22 downstream of and proximate the inlet opening 20. The second end 16 of the housing 12 defines a fluid discharge end **10*b* of the sprinkler assembly 10 having an outlet opening 24. A fluid deflection member 30 is coupled to the housing 12 to locate the fluid deflection member 30 at a preferably fixed distance from the outlet opening 24** along a fluid flow path of the sprinkler assembly extending along the sprinkler axis X-X.

The first end portion 14 of the sprinkler assembly 10 is configured for coupling to a fluid supply pipe (not shown) or pipe fitting of the fire protection system. For example, the first end portion 14 can be externally threaded as shown for coupling to a threaded pipe fitting or connection. Alternatively, the first end portion 14 can be configured, for example, with a groove for a grooved coupling connection or provided with any other suitable connection mechanism and/or arrangement to secure and fluidically connect the sprinkler assembly 10 to a fluid supply pipe. The sprinkler assembly 10 is, preferably, an automatic dry sprinkler assembly in which fluid flow through the sprinkler is regulated by a trigger assembly, preferably, a thermally responsive trigger assembly 40, and an internal fluid control assembly 100 disposed preferably coaxially within the housing 12. The operation of the thermally responsive trigger assembly 40 is based on the temperature of the environmental conditions surrounding the dry sprinkler assembly 10. Alternatively, the dry sprinkler assembly 10 can be an activated dry sprinkler assembly with a responsive trigger assembly that is operated by a control signal, and, in a further preferred embodiment, the dry sprinkler assembly can be an automatic/activated dry sprinkler assembly operated by the temperature of the environmental conditions surrounding the dry sprinkler assembly 10 and/or a control signal provided to the dry sprinkler assembly 10.

The preferred embodiment of the thermally responsive trigger assembly 40 includes a strut, lever, and thermally responsive solder link assembly which is supported by a loading member, such as, a load screw 60. Alternatively, the trigger assembly 40 can be configured as a thermally responsive fluid-filled frangible bulb supported by a loading member. The thermally responsive trigger assembly 40 defines an unactuated state of the sprinkler assembly 10 in which the thermally responsive trigger assembly 40 supports the internal fluid control assembly 100 within the housing 12 to form a fluid-tight seal with the internal sealing surface 22, as seen in FIG. 1, and seal the rest of the sprinkler assembly 10 from the fluid within the supply pipe of the system. Upon thermal operation of the thermally responsive trigger assembly 40, an actuated state of the sprinkler assembly 10 is defined in which the internal fluid control assembly 100 axially translates out of contact with the internal sealing surface 22, as seen in FIG. 2, thereby placing the internal conduit 18 in fluid communication with the fluid supply pipe of the system. Fluid, i.e. water or other firefighting fluid, flows through the internal conduit 18 and through the internal fluid control assembly 100 and is discharged out of the control assembly 100 and/or the outlet opening 24 of the housing 12. The discharged fluid flows along the fluid flow path and impacts the fluid deflection member 30 for distribution about and below the sprinkler assembly 10 to wet the surrounding area and address any fire in the immediate vicinity.

In order to centrally locate the fluid control assembly 100 within the conduit 18 and facilitate its axial translation, the fluid discharge end **10*b* of the outer tubular housing includes a preferred internal surface 200 configuration. As described herein, preferred embodiments of the dry sprinkler assembly 10 include an internal landing surface and a cantilevered surface formation that are axially spaced from one another to circumscribe ejectable components of the fluid control assembly 100 and centrally locate the fluid control assembly 100 in the unactuated state of the sprinkler assembly. Moreover, the preferred internal surface 200 configuration facilitates the centralized axial translation of the fluid control assembly within the conduit in the actuated state of the sprinkler assembly in order to eliminate or minimize any undesired interference between the internal fluid control assembly 100 and the outer housing 12. By eliminating or minimizing undesired interference between components, the internal fluid control assembly 100** can translate to fully open the sprinkler assembly and maximize fluid flow therethrough.

As seen in each of FIGS. 1 and 2, the internal surface 200 of the fluid discharge end **10*b* is circumscribed about the longitudinal sprinkler axis X-X to define the outlet opening 24 of the tubular outer housing 12 and an internal landing surface 210 located along the longitudinal sprinkler axis X-X to be upstream of the outlet opening 24. The internal surface 200 also preferably includes a centering wall 220 circumferentially formed and centered about the longitudinal sprinkler axis X-X between the internal landing surface 210 and the outlet opening 24. As shown herein, the preferred annular centering wall 220 is preferably cantilevered with respect to the internal surface 200 of the housing 12. Axially spacing the internal landing surface 210 and the preferred cantilevered centering wall 220 from one another is a surface discontinuity 230 disposed therebetween preferably extending from the internal landing surface 210 to the centering wall 220**.

Figure 3:
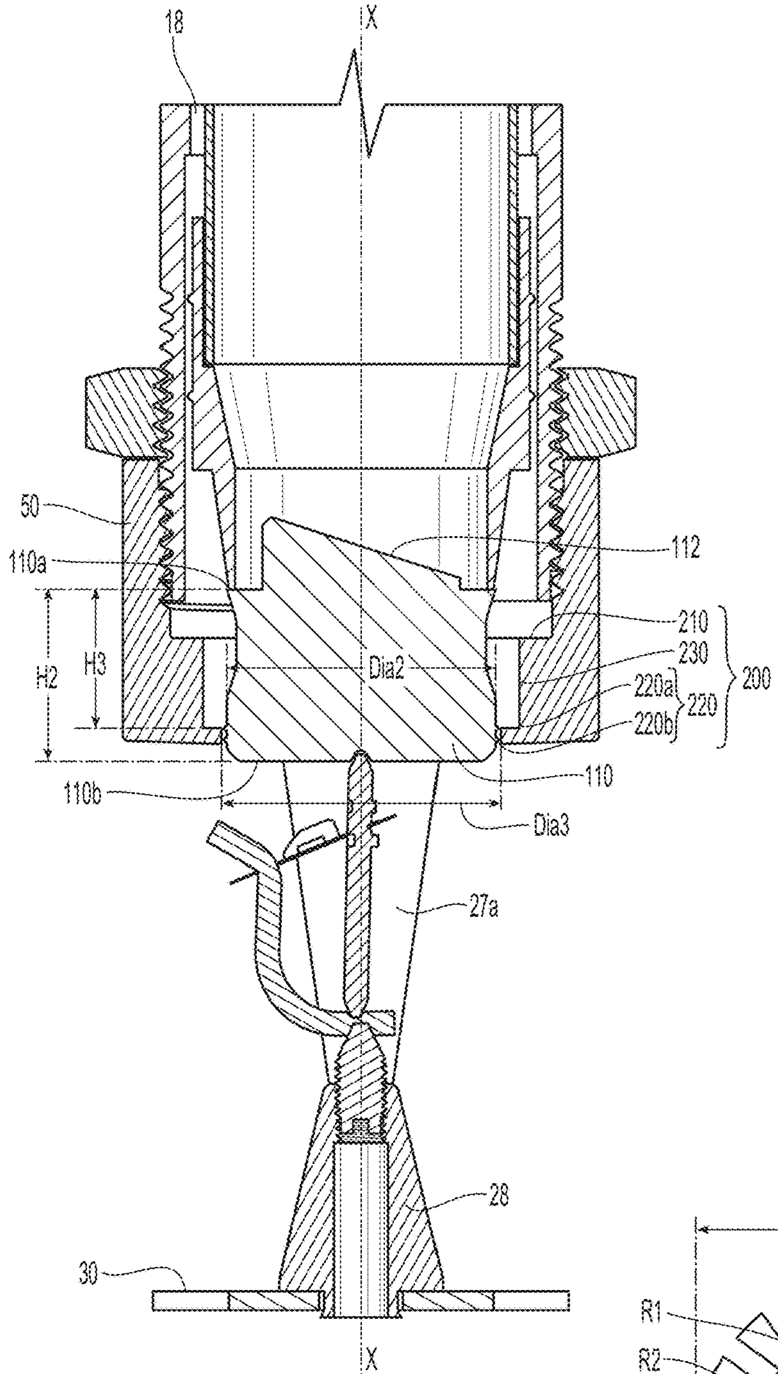
FIG. 3 is a partial cross-sectional view of the dry sprinkler of FIG. 1 in the unactuated state.
Figure 4:
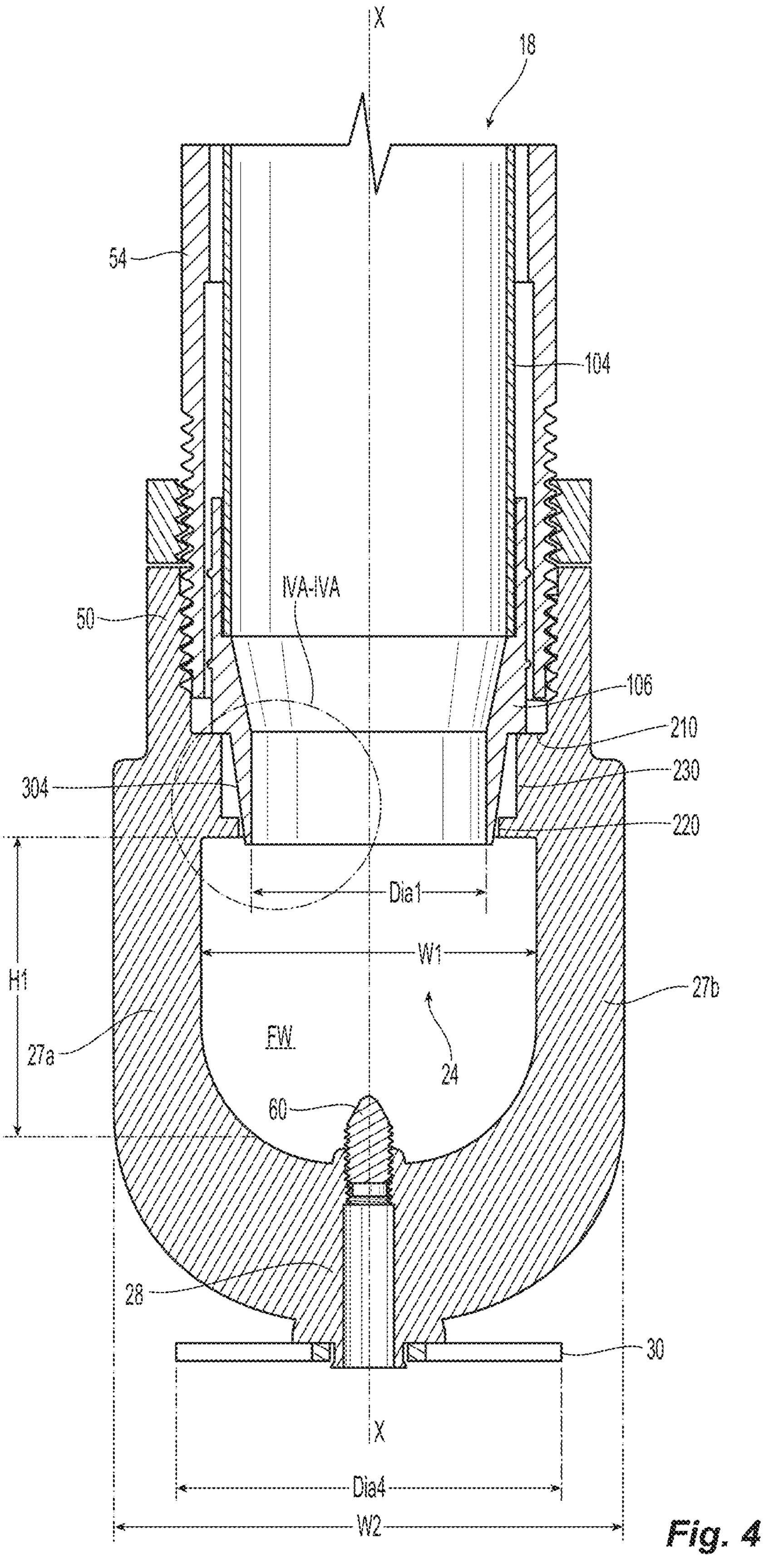
FIG. 4 is a partial cross-sectional view of the dry sprinkler of FIG. 2 in the actuated state.
Figure 4A:
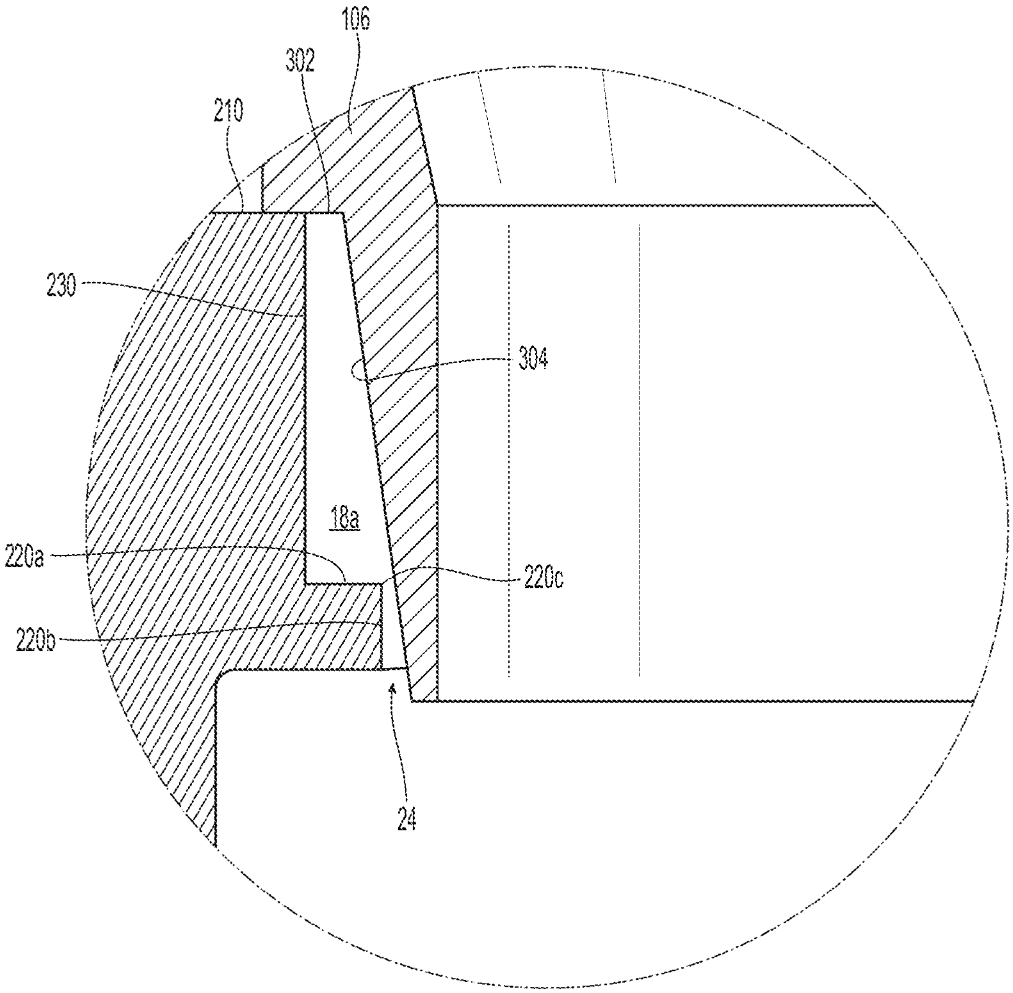
FIG. 4A is a detailed view of area IVA-IVA of FIG. 4.

Shown in FIGS. 3, 4, and 4A are detailed views of the second end portion 16 and fluid discharge end **10*b* of the sprinkler assembly 10. The preferred centering wall 220 shown includes a surface segment 220*a* that extends radially preferably perpendicular to the longitudinal sprinkler axis X-X with the discontinuity surface 230 preferably extending parallel to the sprinkler axis. Alternatively or additionally, the radially extending surface segment 220*a* defines a first surface segment of the centering wall with a second surface segment 220*b* that extends parallel to the longitudinal sprinkler axis from the first surface segment 220*a* to the outlet opening 24. Moreover, the internal second surface segment 220*b* is preferably coterminal with the internal conduit 18 to define the outlet opening 24 of the housing 12. The first surface segment 220*a* and the second surface segment 220*b* intersect at an edge to define an internal centering rim 220*c* of the centering wall 220 within the internal conduit 18**.

To minimize undesired interference with the complete axial translation of the fluid control assembly 100, the internal surface 200 defines an internal surface geometry that is dissimilar to the outer surface geometry of the components of the fluid control assembly 100 that are circumscribed by the internal surface 200. By being "dissimilar", means that the internal surface 200 of the housing 12 and circumscribed outer surface of the fluid control assembly are non-parallel and/or define different concentric cross-sectional profiles. For example, in the unactuated state of the sprinkler assembly 10, as shown in FIG. 3, the internal landing surface 210, preferred cantilevered centering wall 220, and surface discontinuity 230 circumscribe an ejectable support member 110 of the fluid control assembly 100. Generally, the internal surface 200 defines two circular cylindrical surfaces circumscribed about the ejectable support member 110 with the internal landing surface 210 and discontinuity surface 230 defining a first internal diameter and the cantilevered centering wall 220 defining a smaller second internal diameter. More specifically, the internal landing surface 210 defines the larger first internal diameter and the centering wall 220 defines the preferably smaller second internal diameter of the housing 12. In contrast, the ejectable support member 110 defines a cylindrical surface profile of variable diameter with a first diameter circumscribed by the internal landing surface 210 and discontinuity surface 230 and a larger second diameter circumscribed by centering wall 220. Accordingly, in the preferred embodiment of the sprinkler assembly 10, the internal surface 200 of the second end portion 26 of the housing 12 decreases in diameter along the longitudinal sprinkler axis X-X from the inlet opening 20 to outlet opening 24 while the ejectable support member 110 increases in diameter along the longitudinal sprinkler axis X-X from the inlet opening 20 to outlet opening 24.

Figure 5:
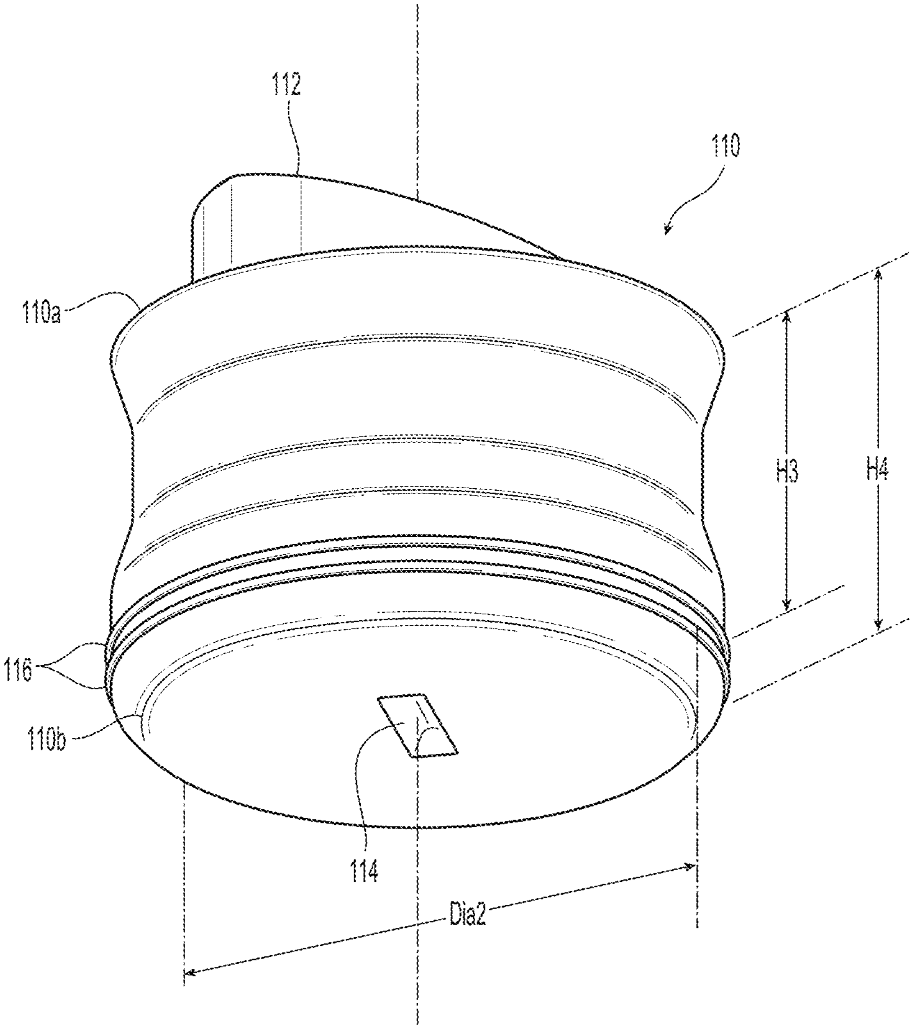
FIG. 5 is a perspective view of a preferred embodiment of an ejectable support member of the dry sprinkler assembly of FIG. 1.

A preferred embodiment of the fluid control assembly 100 includes a seal subassembly 102, a fluid flow tube 104, and a discharge orifice end 106 opposite the seal subassembly 102. Abutting the discharge orifice end 106 is the ejectable support member 110 of the fluid control assembly 100. An exposed end surface **110*b* of the ejectable support member 110 engages the thermally responsive trigger assembly 40. As shown in FIG. 5, in a preferred embodiment of the ejectable support member 110, the end surface 110*b* provides a seat surface with a central slot or channel formation 114. The strut member of the thermally responsive trigger assembly 40 is supported within the central slot or channel formation 114. In an alternate embodiment, the end surface 110*b* can be alternatively configured for seating against a glass bulb with a central pip cap extending through and/or into the ejectable support member 110. Upon thermal actuation and collapse of the trigger assembly 40, the ejectable support member 110 is translated out of the internal conduit 18 of the housing, ejected out the outlet opening 24 and displaced to initially contact the loading member, load screw 60, of the thermally responsive trigger assembly 40, and, then preferably pivoted, out of the fluid flow path between the housing 12 and the fluid deflection member 30. With reference to FIG. 4, the fluid flow tube 104 axially translates so that the discharge orifice end 106 rests upon the internal landing surface 210 with the centering wall 220 preferably circumscribed about an outer surface portion of the discharge orifice end 106. The outer surface portion of the discharge orifice 106 and the internal circumscribing surfaces of the centering wall 220, the landing surface 210 and the discontinuity surface 230** provide for dissimilar and in particular, non-parallel surfaces.

Figure 6:
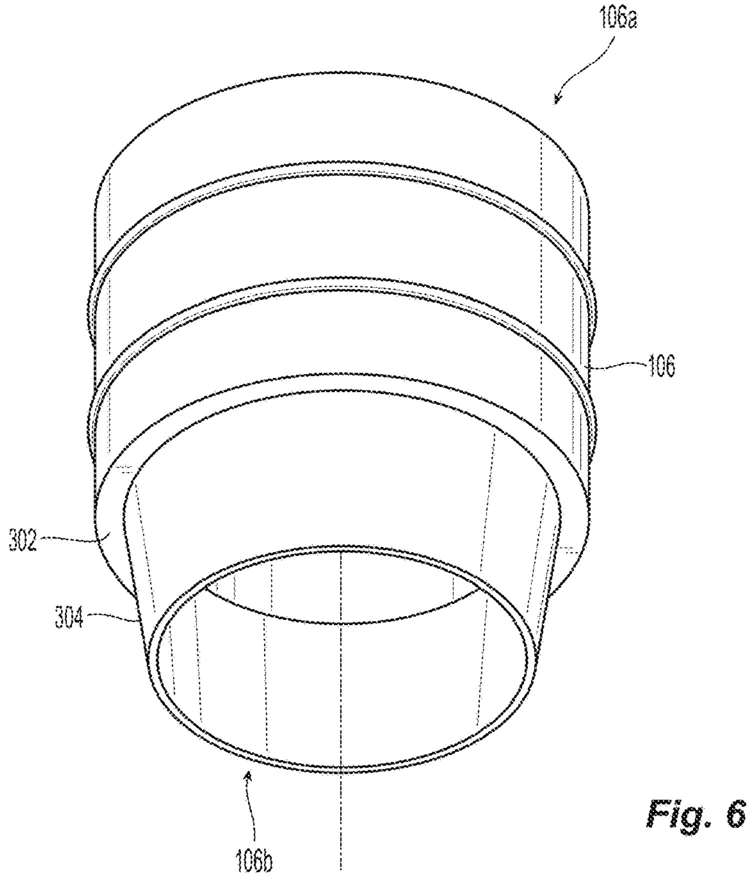
FIG. 6 is a perspective view of a preferred embodiment of a discharge orifice end of the dry sprinkler assembly of FIG. 1.
Figure 7:
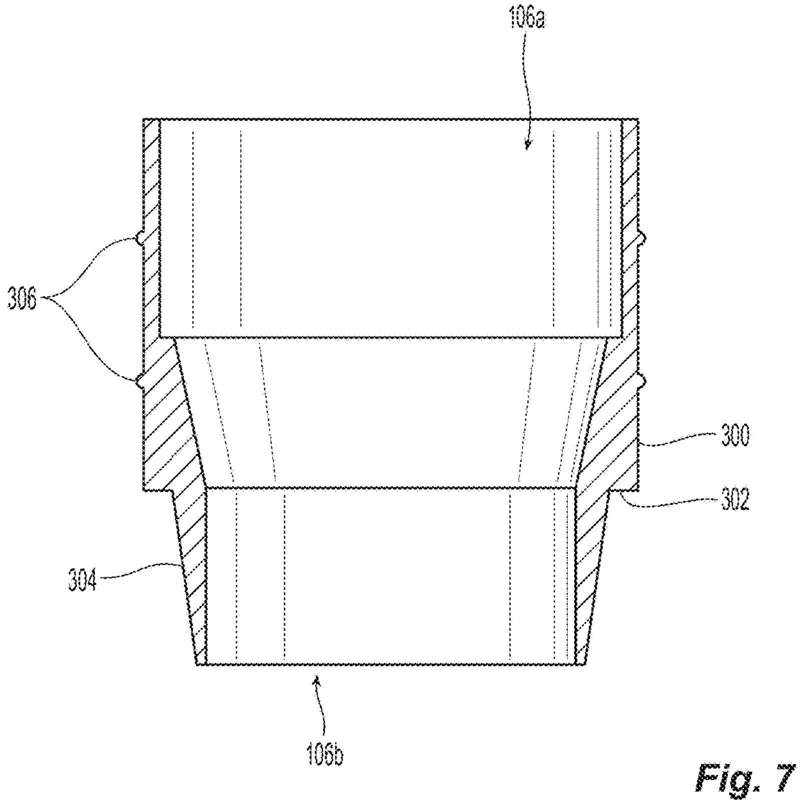
FIG. 7 is a cross-sectional view of the discharge orifice end of FIG. 6.

With reference to FIGS. 6 and 7, the discharge orifice end 106 of the fluid control assembly 100 is a tubular component having a first end **106*a*, a second end 106*b*, with an outer surface 300 therebetween. The outer surface 300 preferably includes or forms an external annular shoulder 302 between the first end 106*a* and the second end 106*b* for surface contact with the internal landing surface 210 of second end portion 16 of the tubular outer housing 12, as seen in FIG. 4, to locate the discharge orifice end 106 within the discharge end portion 10*b* of the housing preferably extending slightly out of the outlet opening 24. The outer surface 304 of the discharge orifice 106 preferably defines a frustoconical surface profile that tapers from the annular shoulder 302 to the end 106*b*. Accordingly, the circumscribed outer surface 304 of the discharge orifice end 106 is preferably skewed with respect to the longitudinal sprinkler axis X-X. In contrast and as previously described, the internal surface 200 of the outer housing is made of a series of surfaces that extend either parallel or perpendicular to the longitudinal sprinkler axis X-X. Thus, as seen in FIG. 4A, the concentric inner surface 200 of the housing and outer surface 304 of the discharge orifice end 106 are dissimilar. Because of the dissimilarity between surfaces 200, 304, the actuated sprinkler assembly preferably forms an annular gap 18*a* between the internal surface 200 of the second end portion of the tubular outer housing and the outer surface 304 of discharge orifice end 106. The internal gap 18*a* also extends between the second wall segment 220*b* of the cantilevered centering wall 200 so that the width of the annular gap 18*b* varies along the longitudinal sprinkler axis X-X from the internal landing surface 210 to the outlet opening 24**.

The varying width of the annular gap **18*a* ensures that the internal centering rim 220*c* defined by the intersection of first surface segment 220*a* and the second surface segment 220*b* of the centering wall 220 within the internal conduit 18 confronts the outer surface 304 of the discharge orifice end 106 to present a restraint for lateral movement of the internal fluid control assembly 100 traverse to the longitudinal sprinkler axis X-X. In the preferred embodiment, the outer surface 304, upon transverse movement of the internal fluid control assembly 100, contacts the centering surface 200 and, in particular, the outer surface 304 contacts only the internal centering rim 220*c* about a curvilinear line segment, while avoiding surface to surface contact with each of the first and second surface segments 200, 220*b* to center the internal fluid control assembly 100 within internal conduit 18 and ensure that fluid, i.e. water and/or other firefighting fluid, discharged from the fluid discharge end 106 provides a column of fluid along and centered about the longitudinal sprinkler axis X-X to impact the fluid deflection member 30**.

In the actuated and open state of the sprinkler assembly 10, fluid flowing through the inlet opening 20 flows at a preferred operating pressure, through the fluid flow tube 104, out the discharge orifice end 106 and the outlet opening 24 to impact the axially spaced fluid deflection member 30. The discharge orifice 106 is preferably configured and dimensioned to define the desired discharge characteristics of the sprinkler. Accordingly, the discharge orifice end 106 can be quantified by a preferred nominal K-factor. The discharge or flow characteristics from the sprinkler assembly is defined by the internal geometry of the sprinkler assembly including its internal passageway, inlet and outlet (the orifice). As is known in the art, the K-factor of a sprinkler is defined as $K=Q/P^{1/2}$, where Q represents the flow rate (in gallons/min GPM) of fluid, such as, water, from the outlet (the orifice) of the internal passage through the sprinkler assembly and P represents the pressure (in pounds per square inch (psi.)) of fluid fed into the inlet end of the internal passageway through the sprinkler assembly. Generally, the discharge characteristics of the sprinkler assembly define a preferred nominal K-factor in a range of 11 [GPM/(psi)½] to 50 [GPM/(psi)½]. Preferred embodiments of the sprinkler assembly 10 define a nominal K-factor which is 16.8 [GPM/(psi)½] or greater. Accordingly, preferred embodiments of the sprinkler can be any one of a nominal 16.8 [GPM/(psi)½]; 19.6 [GPM/(psi)½]; 22.4 [GPM/(psi)½], 25.2 [GPM/(psi)½], 28.0 [GPM/(psi)½], 30.8 [GPM/(psi)½] or 33.6 [GPM/(psi)½]. With reference to FIGS. 4 and 7, in one preferred embodiment of the discharge orifice end 106 having a nominal K-factor ranges from 16.8 [GPM/(psi)½] to 25.2 [GPM/(psi)½], the internal diameter Dia1 of the discharge orifice defined by the discharge orifice end **106*b*** is preferably ranges from 1 inch to 1.1 inch.

Accordingly, in a sprinkler assembly 10 having a discharge orifice end 106 to define a nominal K-factor of 16.8 [GPM/(psi)½] or greater, the ejectable support member 110 and its support surface, and, preferably its annular support shelf 110*a* is sized to support the discharge orifice end 106 and the rest of the fluid control assembly 100. With reference to FIGS. 3 and 5, the ejectable support member 110 defines a variable Dia2 that is preferably at its maximum at the support shelf 110*a* and at the region that is circumscribed by the cantilevered centering wall 220. In preferred embodiments of the ejectable support member 110, its diameter Dia2 is at its maximum larger than the discharge orifice end 106*b* diameter Dia1 and more preferably about 1.05 to 1.1 times larger than the discharge orifice end 106*b* diameter Dia1. The diameter Dia2 of the ejectable support member 110 at its minimum is preferably about 90%-92% of the maximum.

As previously described, in the actuated state of the sprinkler assembly 10, the ejectable support member 110 passes through the outlet opening 24 of the outer housing 12 and the second end 106*b* of the discharge orifice end 106 is circumscribed by the cantilevered centering wall 220 and the outlet opening 24. Accordingly, the outlet opening 24 defines an internal diameter Dia3 that is larger than each of the maximum diameter Dia2 of the ejectable support member 110 and the internal diameter Dia1 of the discharge orifice end 106. Moreover, the internal diameter Dia3 of the outlet opening 24 is preferably sized so that the ejectable support member 110 substantially fills the outlet opening 24 to conceal the internal conduit 18 in the unactuated state of the sprinkler assembly 10 to prevent or minimize the possibility of debris entering the conduit 18. In preferred embodiments, the internal diameter Dia3 of the outlet opening 24 is preferably 1.1 to 1.2 times as large as the internal diameter Dia1 of the discharge orifice end 106, and 1.05 to 1.2 times as large as the maximum diameter Dia2 of the ejectable support member 110.

In the embodiment of the dry sprinkler assembly shown, the fluid discharge end 10*b* of the housing 12 preferably includes an internally threaded sprinkler frame body 50 with the preferred internal surface 200 that surrounds the longitudinal sprinkler axis X-X. Although the tubular housing 12 can be formed as a single unitary structure, the tubular housing 12 is more preferably a sprinkler frame sub-assembly formed by the interconnection of two or more tubular housing components. For example, in the preferred sprinkler assembly 10 of FIG. 1, the housing 12 includes another tubular component 52 that is internally and externally threaded to form the fluid intake end 10*a*. An intermediate externally threaded tubular component 54 interconnects the sprinkler frame body 50 and the tubular component 52. To secure the frame body 50 to the intermediate tubular component 54, the assembly can include a locking nut 56. The components of the housing 12 can be joined by alternate means or configurations provided the assembly provides for the internal conduit 18 and intake and discharge ends 10*a*, 10*b* as described herein.

With reference to FIG. 3, preferred embodiments of the sprinkler housing 12 include a pair of frame arms 27*a*, 27*b*, preferably integrally formed with the frame body 50, that are diametrically opposed about the outlet opening 24 and extend, preferably, axially, downstream and away from the second end 16 of the housing 12 along the longitudinal sprinkler axis X-X. In preferred embodiments, the frame arms 27*a*, 27*b* converge and merge to form a convergence or frame boss 28 centered about the sprinkler axis X-X. The fluid deflection member 30 is preferably affixed to the frame boss 28 to locate the fluid deflection member 30 at the preferred fixed distance from the outlet opening 24. As shown, the frame boss 28 is preferably substantially frustoconical in shape but may define alternate geometries, such as, for example, hemispherical, provided it can support the fluid deflection member 30, trigger assembly 40 or other components of the sprinkler assembly 10.

In the preferred embodiment of the sprinkler assembly 10, a frame window FW, as seen in FIG. 4, is formed between the outlet opening 24 of the tubular housing 12, the pair of frame arms 27*a*, 27*b* and the frame convergence or boss 28. The width W1 of the frame widow FW is preferably defined as the maximum spacing between the frame arms 27*a*, 27*b*. The length or height H1 of the frame window FW is preferably defined by a minimum axial distance from the outlet opening 24 to the frame arms 27*a*, 27*b*. For preferred embodiments of the dry sprinkler assembly 10 having a nominal K-factor of 16.8 [GPM/(psi)½] or greater, the internal diameter Dia3 of the outlet opening 24 is preferably less than the minimum axial distance H1 of the frame window FW. In a preferred aspect, the minimum axial distance H1 is preferably 1.15-1.2 times the internal diameter Dia3 of the outlet opening 24. Preferably, the width of the frame window FW along the minimum axial distance H1 proximate the terminal end of the load screw 60 in the frame window FW is greater than a maximum diameter of the ejectable support member 110 so that, in the actuated state, the ejectable support member 110 contacts the terminal end of load screw within the frame window FW, and prior to contacting the frame arms 27*a*, 27*b*, in order to minimize interference between the ejectable support member 110 and the frame arms 27*a*, 27*b* upon ejection of the ejectable support member 110 from the outlet opening 24, which allows the fluid flow assembly 100 to translate to fully open the sprinkler assembly and maximize fluid flow therethrough.

Additionally, surface features of the fluid control assembly 100 in combination with the preferred cantilevered centering wall 220 facilitate location and centering of the fluid control assembly 100. With reference to FIGS. 1 and 2, the remaining components of the preferred fluid control assembly 100, including the seal subassembly 102 and the fluid flow tube 104 can each be configured and assembled using multiple components, or alternatively, can be configured from a unitary structure, so that the sealing subassembly and the fluid flow tube are coupled together; that is, joined as separate components or joined sections of a unitary member. For example, the seal subassembly 102 preferably includes a spring disc 101 affixed about a base 103 having an array of legs 103*a* extending therefrom. In the unactuated state of the sprinkler assembly, the spring disc 101 forms the fluid-tight sealed contact with the internal seal surface 22 of the housing. The seal subassembly 102 can be configured as any one of the embodiments of "spring support assembly" shown and described in the dry sprinkler assembly of U.S. Pat. No. 8,636,075. The desired translation of the fluid control assembly 100 provides that the base 103 is centrally located in the enlarged conduit portion of the inlet component 52 of the housing 12 to maximize the fluid flow about the seal assembly 102. The enlarged region includes a cross-sectional area that is greater than each cross-sectional area of the inlet opening 20, the outlet opening 24, and any other cross-sectional area of the internal conduit 18.

Preferred embodiments of the support member 110 and discharge orifice end 106 include surface features to locate the seal subassembly 102 against the internal sealing surface 22 in the unactuated state of the sprinkler assembly 10 and provide proper axial translation to locate the seal subassembly 102 within the enlarged region of the internal conduit 18 upon sprinkler actuation. Shown in FIG. 5 is a preferred embodiment of the ejectable support member 110. The ejectable support member 110 is preferably a unitary generally cylindrical member having the variable diameter Dia2 over its axial length. Preferably, included along the peripheral surface of the ejectable support member 110 are a pair of axially spaced circumferential ribs 116. These ribs 116 can provide one or more visual indicators for sprinkler assembly. Each rib 116 is respectively axially located from the support shelf 110*a* at axial distances H3, H4. In the sprinkler assembly 10, locating the preferred ribs 116 within the cantilevered centering wall 220, as seen in FIG. 3, locates the support shelf 110*a* within the conduit 18 to support the discharge orifice end 106, fluid flow tube 104 and the seal assembly 102 in the fluid tight sealed contact against the internal sealing surface 22 as shown in FIG. 1. The ribs 116 can also inhibit debris or corrosion from entering and/or forming between the ejectable support member 110 and the cantilevered centering wall 220. To axially adjust the location of the ejectable support member 110, the sprinkler assembly 10 includes the load screw 60 engaged with the frame boss 28 which can be used to axially adjust the position of the trigger assembly 40 and fluid flow assembly 100 at a proper sealing load.

Moreover, by locating the preferred ribs 116 within the annular centering wall 220, the external annular shoulder 302 is axially spaced from the internal landing surface 210 to define a preferred axial translation distance for the discharge orifice end 106 to locate the seal assembly 102 in the desired actuated position. For the preferred embodiments of the sprinkler assembly 10 having a nominal K-factor of 16.8 [GPM/(psi)½] or greater, the preferred axial spacing H3, H4 between the ribbing 16 and the annular support shelf 110*a* is preferably ½-¾ of the internal diameter Dia1 of the discharge opening define by the discharge orifice end 106*b*. Alternatively, or additionally, the axial spacing H3, H4 is preferably ½-¾ the maximum diameter Dia2 of the ejectable support member 110.

To further facilitate centering of the support member 110, the ejectable support member 110 preferably includes a central impact post or surface 112 extending axially from the support shelf 110*a* for insertion into the discharge orifice end 106 in the unactuated state of the sprinkler assembly 10 and preferably intersecting the longitudinal sprinkler axis X-X as seen in FIG. 3. The discharge orifice end 106 abuts the support shelf 110*a* about the central impact post or surface 112. Due to the preferred axial spacing H3, H4 between the ribbing 116 and the annular support shelf 110*a*, the discharge end orifice 106 abuts the annular support shelf 110*a* between the internal landing surface 210 and the inlet opening 20. As such, the internal landing surface 210 and the cantilever centering wall 220 circumscribe the ejectable support member 110 along the longitudinal sprinkler axis X-X between the terminal end of the discharge orifice end 106 of the fluid flow tube 110 and the outlet opening 24 of the second end portion. The location of the terminal end of the discharge orifice end 106 and preferred axial spacing H3, H4 between the ribbing 116 and the annular support shelf 110*a* allows for the outer surface 304 of the discharge orifice end 106 between the external annular shoulder 302 to the terminal end of the discharge orifice end 106 to have a length that is less than the height H2 along the longitudinal sprinkler axis X-X of the ejectable support member 110 between the support surface, and, in particular, the support shelf 110*a* and the seat surface 110*b*. In preferred embodiments, a length of the frustoconical profile of the outer surface 304 between the external annular shoulder 302 to the terminal end has a length along the longitudinal sprinkler axis X-X that is less than the height H2 along the longitudinal sprinkler axis X-X of the ejectable support member 110 between the support shelf 110*a* and the seat surface 110*b*, which minimizes undesired interference between components of the sprinkler assembly 10 and allows the internal fluid control assembly 100 to translate to fully open the sprinkler assembly 10 and maximize fluid flow therethrough.

Moreover, the impact post 112 is preferably formed with a skewed impact surface to alter the center of gravity of the ejectable support member 110. Upon ejection of the support member 110 from the outlet opening 24 in the actuated state of the sprinkler assembly 10 and after the ejectable support member 110 contacts the load screw 60 within the frame window FW, fluid can impact the skewed surface to pivot the member out of the fluid flow path between outlet opening 24 and the fluid deflection member 30. To further facilitate proper ejection, the ejectable support member 110 is also sized to minimize interference with the frame arms 27*a*, 27*b*. In preferred embodiments, the axial length H2 of the ejectable support member 110 between the support shelf 110*a* and the seating surface 110*b* is ½ to ¾ times the minimum axial height H1 of the frame window FW.

The discharge orifice end 106 also preferably includes centering surface features. As seen in the embodiment of the discharge orifice end 106 in FIGS. 6 and 7, the outer surface 300 includes peripheral ribbing 306 that can form surface contact with the inner surface of the intermediate tubular component 54 of the outer housing 12, as illustrated in FIG. 3, to maintain the fluid control assembly 100 centered within the conduit 18.

Figure 8:
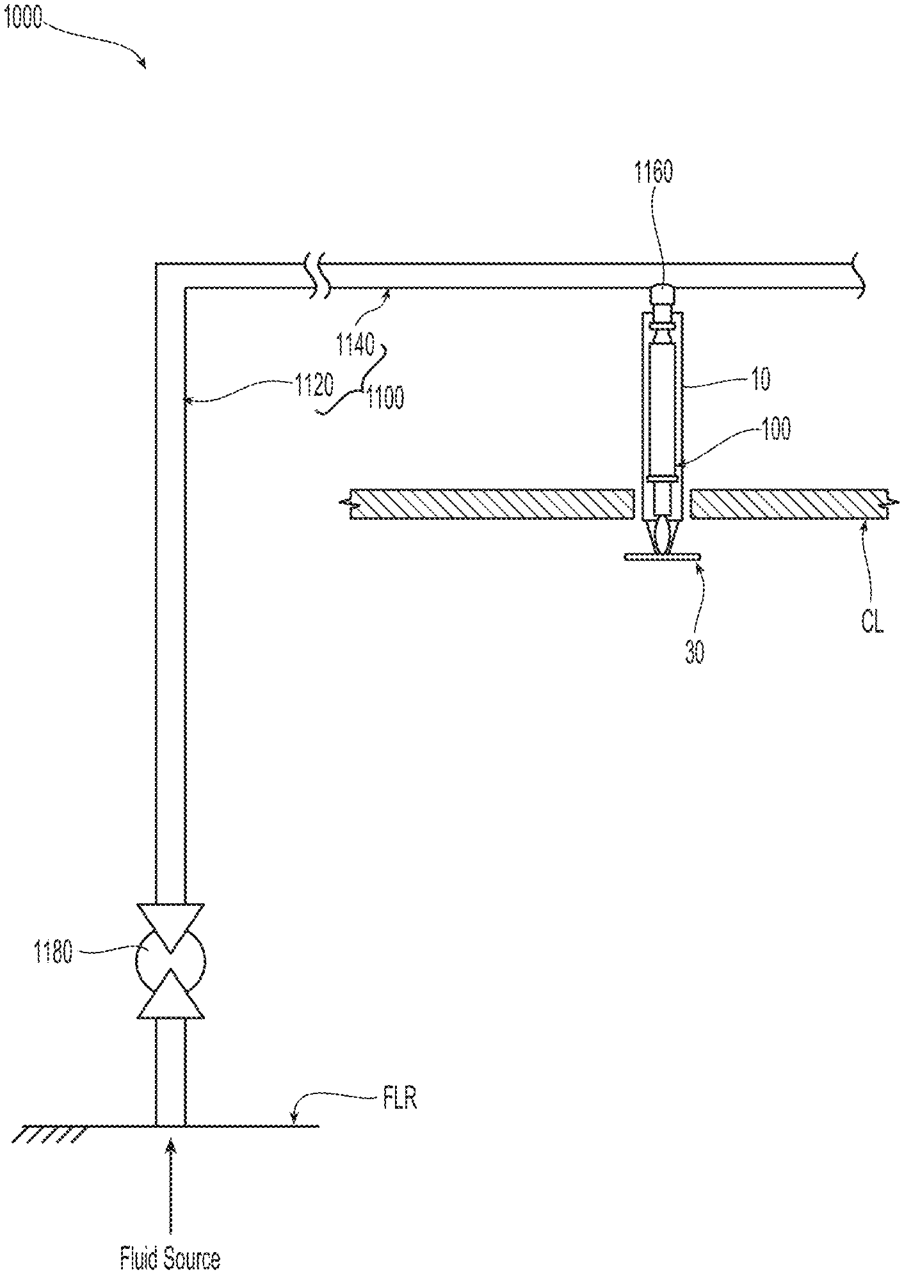
FIG. 8 is a schematic view of an illustrative wet sprinkler system utilizing the dry sprinkler assembly of FIG. 1.

FIG. 8 schematically shows a preferred fire protection sprinkler system 1000 using a preferred embodiment of dry sprinkler assembly 10 as described herein. A preferred embodiment of the system 1000 includes a network of pipes 1100 that includes a fluid supply riser 1120 and at least one branch pipe 1140 coupled to the fluid supply riser by one or more cross-mains. As shown, a preferred embodiment of the dry fire protection sprinkler 10 is coupled to the branch pipe by an appropriate fitting 1160. A fluid valve 1180 is optionally coupled to the riser to deliver firefighting fluid to the network of pipes and the sprinkler assembly 10 from a fluid source.

As a pendent sprinkler, the dry sprinkler assembly 10 and its fluid deflection member 30 are installed in a pendent orientation in which water is discharged from the outlet opening 24 in a vertical direction ceiling CL-to-floor FLR to impact the fluid deflection member 30. In the fire protection system pendent installation, the sprinkler assembly 10 is coupled to extend vertically from an overhead fluid supply pipe, branch pipe 1140. The sprinkler assembly 10 is preferably rotationally oriented with the frame arms 27*a*, 27*b* in line with the branch pipe 1140. Upon sprinkler actuation, the preferred ejectable support member 110 is ejected vertically with respect to the overhead supply pipe and the seal subassembly 102 and fluid flow tube 104 translate vertically toward the outlet opening 24. With the ejectable support member 110 ejected clear of the sprinkler assembly 10, the inlet opening 20 and the discharge orifice of the discharge orifice end 106 are fully open and the fluid flow path are clear for flow of firefighting fluid therethrough to impact the pendent fluid deflection member 30.

Preferred embodiments of the dry sprinkler assembly 10 are configured for fire suppression performance and more preferably qualified for suppression performance of a storage commodity with a thermal responsiveness to fire or sufficient level of heat that is faster than standard response, e.g., quick response, fast response or early fast response, with a preferred response time index (RTI) of 50 (m-s)½[100 (ft-s)½] or less, preferably no more than 36 (m-s)½, [65 (ft-s)½], and even more preferably 19 to 36 (m-s)½[35-65 (ft-s)½]. The thermally responsive trigger assembly 40 can be configured with a frangible glass bulb or a fusible link arrangement. More preferably, embodiments of the dry sprinkler assembly 10 can be configured as an early suppression fast response (ESFR) dry pendent sprinkler and/or a Quick Response Storage Sprinkler having a nominal K-factor of 22.4 [GPM/(psi)½] of greater and even more preferably having a nominal K-factor of 25.2 [GPM/(psi)½]. Accordingly, preferred embodiments of the ESFR dry pendent sprinkler assembly 10 have a thermally responsive trigger assembly 40 with an RTI of no more than 65 (ft-s)½[36 (m-s)½]. The thermally responsive trigger 40 is preferably thermally rated in a range of 155° F. to 210° F. and, more preferably ranges from 165° F. to 205° F., and is preferably thermally rated at 165° F. or 205° F.

The fluid deflection member 30 of the preferred ESFR dry pendent sprinkler assembly 10 is configured for distribution of firefighting fluid in a manner sufficient to suppress a fire. Shown in FIGS. 3 and 4 is a preferred embodiment of a fluid deflection member 30 for suppression performance. The fluid deflection member 30 is formed as a preferably planar member that when installed defines an upper planar surface and an opposite planar surface that are parallel to one another and perpendicular to the longitudinal sprinkler axis X-X.

Figure 3A:
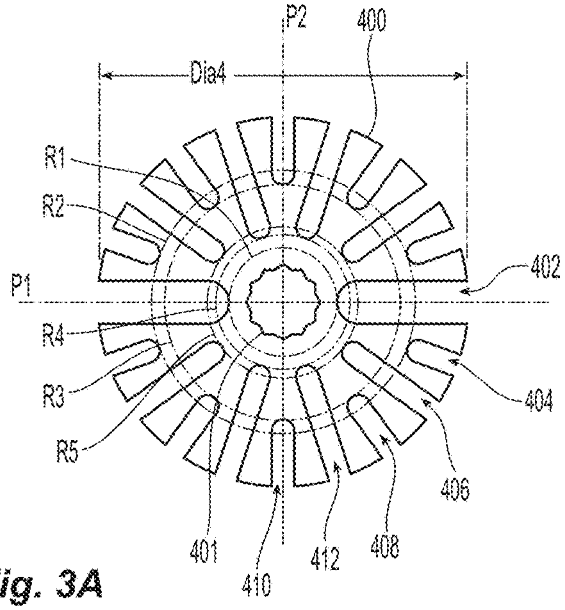
FIG. 3A is a preferred embodiment of fluid deflector member of the dry sprinkler of FIG. 1.

With reference to the plan view of the preferred fluid deflection member 30 in FIG. 3A, the preferred fluid deflection member 30 has a perimeter 400 and a central opening or through hole 401 with the fluid deflection member formed to define a plurality of spaced apart tines defining a plurality of opposed slot pairs 402, 404, 406, 408, 410, and 412 between adjacent tines. Each slot has a first width at the perimeter 400 of the fluid deflection member and radiused portion between the first width and the central through hole 401 of the fluid deflection member. The widths of five slot groups 404, 406, 408, 410 and 412 are preferably the same at the perimeter of the fluid deflection member with the first group of slots 402 preferably having the widest slot width. The spaced apart terminal ends or edges of each tine collectively define the perimeter 400 of the fluid deflection member 30. The perimeter 400 is preferably on a common circle to define a preferred deflector diameter Dia4.

As seen in FIG. 4, the diameter Dia4 of the fluid deflection member 30 is preferably larger than the internal diameter of the discharge orifice end diameter Dia1. For preferred embodiments of the dry sprinkler assembly 10 having a nominal K-factor of 16.8 [GPM/(psi)½] or greater, and more preferably 22.4 [GPM/(psi)½] of greater, and even more preferably having a nominal K-factor of 25.2 [GPM/(psi)½], the deflector 30 and discharge orifice end 106 define a preferred fluid deflection member diameter, in particular, a deflector-diameter to discharge-orifice-diameter ratio (Dia4: Dia1) that ranges from 2:1 to 1.5:1 and, more preferably, ranges from 1.75:1 to 1.5:1. In the preferred sprinkler assembly 10, the fluid deflection member diameter Dia4 is preferably greater than the width W1 of the frame window FW and less than the outer peripheral width W2 defined by the frame arms 27*a*, 27*b*.

The six different opposed slot pairs 402, 404, 406, 408, 410, and 412 are differentiated by their location and/or their geometry including their radial lengths and/or widths. In defining the slot lengths of the various slot groups, the radiused portions of each slot is tangent to a concentric circle circumscribed about the common center. In the preferred deflection member 30, the first group of opposed slot pairs 402 aligned along a first bisecting plane P1, each terminate at a tangential circle defining the smallest radius R1. Accordingly, the first group of slots 402 have the longest length of all the slots. In the sprinkler assembly 10, the first group of opposed slot pairs 402 and the first bisecting plane P1 are preferably aligned with the frame arms 27*a*, 27*b*. Disposed adjacent to the first group of slots 402 are slots of the second group 404, which have the smallest slot length terminating tangent to a circle having the largest radius R2.

The third group of slots 406 preferably terminate at a fifth tangential circle defining a fifth radius R5. Each of the fourth and fifth group of slots 408, 410 are of a common slot length terminating tangent to a circle having a third radius R3. The fifth group of opposed slots 410 are preferably aligned along a second bisecting plane P2 perpendicular to the first bisecting plane P1. The sixth group of slots 412 preferably terminate at a fourth tangential circle defining a fourth radius R4 having a length which is preferably between the first radius R1 and the fifth radius R5. Thus, the third group of slots 406, which preferably terminate at the fifth radius R5, have a length which is preferably between the third radius R3 and the fourth radius R4. Moreover, the sixth group of slots 412 are preferably disposed about the fifth group of slots 410 and the second bisecting plane P2. There are preferably a total of twenty slots with one pair of first group slots 402, two pairs of second group slots 404, two pairs of third group slots 406, two pairs of fourth group slots 408, one pair of fifth group slots 410 and two pairs of sixth group of slots 412. The arrangement of slot groups is preferably symmetrical about each of the first and second bisecting planes P1, P2.

Further variations in the slot features or variations in the combination of similar slot features can define alternate embodiments of the deflector that are suitable for providing a suppression spray pattern for use in the system 1000. For example, there can be fewer slots, or all the slot groups can have a common slot width at the perimeter with the second group of slots being the longest slots and the fifth group of slots being the shortest. To vary the lengths of the slots, the concentric circles can define alternative radii from the deflector center to which one or more radiused slot portions run tangent.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. An automatic dry sprinkler assembly comprising:

a tubular outer housing extending along a longitudinal sprinkler axis including:

a first end portion having an internal surface circumscribed about the longitudinal sprinkler axis to define an inlet opening of the tubular outer housing, an annular sealing surface axially spaced from the inlet opening, and an enlarged conduit portion;

a second end portion having an internal surface circumscribed about the longitudinal sprinkler axis to define an outlet opening of the tubular outer housing; and an internal conduit extending from the first end portion to the second end portion along the longitudinal sprinkler axis to axially space the annular sealing surface from the outlet opening;

a fluid deflection member coupled to the tubular outer housing via a pair of frame arms to locate the fluid deflection member at a fixed distance from the outlet opening and centered on the longitudinal sprinkler axis;

a thermally responsive trigger seated between the fluid deflection member and the outlet opening to define an unactuated state of the sprinkler assembly, the thermally responsive trigger having a thermal response defining an actuated state of the sprinkler assembly; and a fluid control assembly disposed coaxially within the internal conduit, the fluid control assembly including:

a seal subassembly having a first position in fluid tight sealed contact with the annular sealing surface in the unactuated state of the sprinkler assembly and a second position axially spaced from the annular sealing surface in the actuated state of the sprinkler assembly;

a fluid flow tube having a fluid intake end coupled to the seal subassembly and a discharge orifice end opposite the fluid intake end supported by the thermally responsive trigger so as to locate the seal subassembly in the first position, the discharge orifice end defining a nominal K-factor of 25.2 gpm/(psi)$^{1/2}$, and an ejectable support member having a support surface and a seat surface, the ejectable support member being disposed in the outlet opening of the tubular outer housing in the unactuated state of the sprinkler assembly with the support surface abutting a terminal end of the discharge orifice end of the fluid flow tube and the seat surface engaging the thermally responsive trigger so as to locate the seal subassembly in the first position, wherein the fluid deflection member is a planar member having a plurality of tines defining a plurality of spaced apart slots and a diameter of the planar member, wherein the plurality of spaced apart slots comprises a first group of opposed slot pairs aligned along a first bisecting plane aligned with the pair of frame arms, a second group of opposed slot pairs aligned along a second bisecting plane that is perpendicular to the first bisecting plane, and at least three additional groups of opposed slot pairs disposed symmetrical about each of the first bisecting plane and the second bisecting plane, wherein the at least three additional groups of opposed slot pairs comprise a central opposed slot pair and two lateral opposed slot pairs, wherein each of the slots of the central opposed slot pair comprises a central slot length and each of the slots of the two lateral opposed slot pairs comprises a lateral slot length, wherein the lateral slot length is greater than the central slot length, wherein the discharge orifice end comprises a discharge orifice defining a discharge orifice diameter and wherein a deflector-diameter to discharge-orifice-diameter ratio ranges from 2:1 to 1.5:1, the fluid deflection member providing suppression performance for a minimum operating pressure of firefighting fluid provided to the inlet opening in the actuated state of the sprinkler assembly, wherein the enlarged conduit portion is symmetrical about the longitudinal sprinkler axis, wherein the seal subassembly engages the fluid intake end to axially translate with the fluid intake end, and wherein the seal subassembly is disposed along and about the longitudinal sprinkler axis in both the unactuated state and the actuated state, wherein the ejectable support member comprises a side surface with a varying diameter between the support surface and the seat surface of the ejectable support member, wherein a majority of the side surface is disposed within the tubular outer housing in the unactuated state of the sprinkler assembly so that a maximum diameter of the varying diameter is disposed between the outlet opening of the tubular outer housing and the discharge orifice end of the fluid flow tube, and wherein, at the second position of the seal subassembly, the seal subassembly is located within the enlarged conduit portion of the first end portion, and the terminal end of the discharge orifice end is located between the outlet opening and the fluid deflection member.

2. The automatic dry sprinkler assembly of claim 1, wherein the terminal end of the discharge orifice end comprises a tapered outer surface, wherein the support surface and the seat surface define a height along the longitudinal sprinkler axis, and, wherein the height is greater than a length of the tapered outer surface of the discharge orifice end along the longitudinal sprinkler axis.

3. The automatic dry sprinkler assembly of claim 1, wherein the ejectable support member comprises an impact surface configured to alter the center of gravity of the ejectable support member in the actuated state of the sprinkler assembly.

4. The automatic dry sprinkler assembly of claim 3, wherein the impact surface comprises a first portion and a second portion, wherein the first portion comprises a first distance to the support surface and the second portion comprises a second distance to the support surface, and wherein the first distance is greater than the second distance.

5. The automatic dry sprinkler assembly of claim 3, wherein the impact surface defines an asymmetric surface about a central axis of the ejectable support member.

6. The automatic dry sprinkler assembly of claim 5, wherein the asymmetric surface comprises a skewed surface with respect to the central axis of the ejectable support member.

7. The automatic dry sprinkler assembly of claim 1, wherein the plurality of spaced apart slots comprises an even number of total slots.

8. The automatic dry sprinkler assembly of claim 7, wherein the even number of total slots comprises twenty slots or less.

9. The automatic dry sprinkler assembly of claim 7, wherein each of the slots of the central opposed slot pair comprises a central slot width and each of the slots of the two lateral opposed slot pairs comprises a lateral slot width, and wherein the lateral slot width comprises a common slot width at a perimeter of the planar member.

10. The automatic dry sprinkler assembly of claim 1, wherein the thermally responsive trigger comprises a strut, a lever and a thermally responsive link coupling the strut and lever, and a loading member comprising a load screw.

11. The automatic dry sprinkler assembly of claim 1, wherein the first end portion comprises an external thread circumscribed about the longitudinal sprinkler axis between the inlet opening and the annular sealing surface.

12. An automatic dry sprinkler assembly comprising:

a tubular outer housing extending along a longitudinal sprinkler axis including:
a first end portion having an internal surface circumscribed about the longitudinal sprinkler axis to define an inlet opening of the tubular outer housing, an annular sealing surface axially spaced from the inlet opening, and an enlarged conduit portion symmetrical about the longitudinal axis,
a second end portion having an internal surface circumscribed about the longitudinal sprinkler axis to define an outlet opening of the tubular outer housing, and
an internal conduit extending from the first end portion to the second end portion along the longitudinal sprinkler axis to axially space the annular sealing surface from the outlet opening;
a fluid deflection member coupled to the tubular outer housing to locate the fluid deflection member at a fixed distance from the outlet opening and centered on the longitudinal sprinkler axis, the fluid deflection member comprises a planar member having a plurality of tines defining a plurality of spaced apart slots and a deflector diameter of the fluid deflection member;
a thermally responsive trigger seated between the fluid deflection member and the outlet opening to define an unactuated state of the sprinkler assembly, the thermally responsive trigger having a thermal response defining an actuated state of the sprinkler assembly; and
a fluid control assembly disposed coaxially within the internal conduit, the fluid control assembly including:
a seal subassembly having a first position in fluid tight sealed contact with the annular sealing surface in the unactuated state of the sprinkler assembly and a second position axially spaced from the annular sealing surface in the actuated state of the sprinkler assembly;
a fluid flow tube having a fluid intake end coupled to the seal subassembly and a discharge orifice end defining a discharge orifice at a terminal end of the discharge orifice end supported by the thermally responsive trigger to locate the seal subassembly in the first position, the discharge orifice defining a discharge orifice diameter, and
an ejectable support member having a support surface, a seat surface, and a side surface extending between the support surface and the seat surface, the ejectable support member being disposed in the outlet opening in the unactuated state of the sprinkler assembly with the support surface abutting the terminal end of the discharge orifice end of the fluid flow tube and the seat surface engaging the thermally responsive trigger to locate the seal subassembly in the first position,
wherein the plurality of tines defining a plurality of spaced apart slots of the fluid deflection member are configured to provide suppression performance for a minimum operating pressure of firefighting fluid provided to the inlet opening in the actuated state of the sprinkler assembly,
wherein the discharge orifice defines a nominal K-factor of 25.2 $gpm/(psi)^{1/2}$,
wherein a ratio of the deflector diameter to the discharge orifice diameter ranges from 2:1 to 1.5:1,
wherein the seal subassembly engages the fluid intake end to axially translate with the fluid intake end, and wherein the seal subassembly is disposed along and about the longitudinal sprinkler axis in both the unactuated state and the actuated state,
wherein the side surface comprises a varying diameter between the support surface and the seat surface of the ejectable support member, and
wherein, in the unactuated state of the sprinkler assembly, a maximum diameter of the varying diameter is disposed between the outlet opening of the tubular outer member and the terminal end of the discharge orifice end of the fluid flow tube.

13. The automatic dry sprinkler assembly of claim 12, wherein a majority of the side surface is disposed within the tubular outer housing in the unactuated state of the sprinkler assembly.

14. The automatic dry sprinkler assembly of claim 13, wherein the ejectable support member comprises an impact surface configured to alter the center of gravity of the ejectable support member in the actuated state of the sprinkler assembly, and wherein the impact surface defines an asymmetric surface about a central axis of the ejectable support member.

15. The automatic dry sprinkler assembly of claim 12, wherein the plurality of spaced apart slots comprises a first group of opposed slot pairs aligned along a first bisecting plane, a second group of opposed slot pairs aligned along a second bisecting plane, and at least three additional groups of opposed slot pairs disposed symmetrical about each of the first bisecting plane and the second bisecting plane.

16. The automatic dry sprinkler assembly of claim 12, wherein, at the second position of the seal subassembly, the seal subassembly is located within the enlarged conduit portion of the first end portion, and the terminal end of the discharge orifice end is located between the outlet opening and the fluid deflection member.

17. An automatic dry sprinkler assembly comprising:
a tubular outer housing extending along a longitudinal sprinkler axis including:
a first end portion having an internal surface circumscribed about the longitudinal sprinkler axis to define an inlet opening of the tubular outer housing, an annular sealing surface axially spaced from the inlet opening, and an enlarged conduit portion symmetrical about the longitudinal axis,
a second end portion having an internal surface circumscribed about the longitudinal sprinkler axis to define an outlet opening of the tubular outer housing, and
an internal conduit extending from the first end portion to the second end portion along the longitudinal sprinkler axis to axially space the annular sealing surface from the outlet opening;
a fluid deflection member coupled to the tubular outer housing to locate the fluid deflection member at a fixed distance from the outlet opening and centered on the longitudinal sprinkler axis, the fluid deflection member comprises a planar member having a plurality of tines defining a plurality of spaced apart slots and a deflector diameter of the fluid deflection member;
a thermally responsive trigger seated between the fluid deflection member and the outlet opening to define an unactuated state of the sprinkler assembly, the thermally responsive trigger having a thermal response defining an actuated state of the sprinkler assembly; and
a fluid control assembly disposed coaxially within the internal conduit, the fluid control assembly including:

a seal subassembly having a first position in fluid tight sealed contact with the annular sealing surface in the unactuated state of the sprinkler assembly and a second position axially spaced from the annular sealing surface in the actuated state of the sprinkler assembly;

a fluid flow tube having a fluid intake end coupled to the seal subassembly and a discharge orifice end defining a discharge orifice at a terminal end of the discharge orifice end supported by the thermally responsive trigger to locate the seal subassembly in the first position, the discharge orifice defining a discharge orifice diameter, and an ejectable support member having a support surface, a seat surface, and a side surface extending between the support surface and the seat surface, the ejectable support member being disposed in the outlet opening in the unactuated state of the sprinkler assembly with the support surface abutting the terminal end of the discharge orifice end of the fluid flow tube and the seat surface engaging the thermally responsive trigger to locate the seal subassembly in the first position, wherein the discharge orifice defines a nominal K-factor of 25.2 gpm/(psi)$^{1/2}$, wherein a ratio of the deflector diameter to the discharge orifice diameter ranges from 2:1 to 1.5:1, wherein the seal subassembly engages the fluid intake end to axially translate with the fluid intake end, and wherein the seal subassembly is disposed along and about the longitudinal sprinkler axis in both the unactuated state and the actuated state, wherein the plurality of tines defining a plurality of spaced apart slots of the fluid deflection member are configured to provide suppression performance for a minimum operating pressure of firefighting fluid provided to the inlet opening in the actuated state of the sprinkler assembly, wherein the plurality of spaced apart slots comprises a first group of opposed slot pairs aligned along a first bisecting plane, a second group of opposed slot pairs aligned along a second bisecting plane, and at least three additional groups of opposed slot pairs disposed symmetrical about each of the first bisecting plane and the second bisecting plane, wherein the at least three additional groups of opposed slot pairs comprise a central opposed slot pair and two lateral opposed slot pairs, wherein each of the slots of the central opposed slot pair comprises a central slot length and each of the slots of the two lateral opposed slot pairs comprises a lateral slot length, and wherein the lateral slot length is greater than the central slot length.

18. The automatic dry sprinkler assembly of claim 17, wherein the side surface of the ejectable support member comprises a varying diameter between the support surface and the seat surface of the ejectable support member, and wherein a majority of the side surface is disposed within the tubular outer housing in the unactuated state of the sprinkler assembly so that a maximum diameter of the varying diameter is disposed between the outlet opening of the tubular outer member and the discharge orifice end of the fluid flow tube.

19. The automatic dry sprinkler assembly of claim 17, wherein, at the second position of the seal subassembly, the seal subassembly is located within the enlarged conduit portion of the first end portion, and the terminal end of the discharge orifice end is located between the outlet opening and the fluid deflection member.

20. The automatic dry sprinkler assembly of claim 17, wherein the seal subassembly engages the fluid intake end to axially translate with the fluid intake end, and wherein the seal subassembly is disposed along and about the longitudinal sprinkler axis in both the unactuated state and the actuated state.

* * * * *